United States Patent
Chen et al.

(10) Patent No.: US 10,251,190 B2
(45) Date of Patent: Apr. 2, 2019

(54) UPLINK FREQUENCY SELECTION SCHEDULING METHOD AND DEVICE

(71) Applicant: DATANG MOBILE COMMUNICATIONS EQUIPMENT CO., LTD., Beijing (CN)

(72) Inventors: Xianguo Chen, Beijing (CN); Wei Lin, Beijing (CN); Shuxia Dong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 167 days.

(21) Appl. No.: 15/311,347

(22) PCT Filed: May 12, 2015

(86) PCT No.: PCT/CN2015/078777
§ 371 (c)(1),
(2) Date: Nov. 15, 2016

(87) PCT Pub. No.: WO2015/176617
PCT Pub. Date: Nov. 26, 2015

(65) Prior Publication Data
US 2017/0079057 A1    Mar. 16, 2017

(30) Foreign Application Priority Data
May 23, 2014    (CN) .......................... 2014 1 0223011

(51) Int. Cl.
*H04L 5/00*    (2006.01)
*H04W 72/12*    (2009.01)

(52) U.S. Cl.
CPC ....... *H04W 72/1268* (2013.01); *H04L 5/0048* (2013.01); *H04W 72/12* (2013.01); *H04W 72/1231* (2013.01); *H04W 72/1247* (2013.01)

(58) Field of Classification Search
None
See application file for complete search history.

(56) References Cited

U.S. PATENT DOCUMENTS

2014/0219197 A1*  8/2014  Chaudhuri .......... H04W 52/243
                                                    370/329
2015/0282187 A1* 10/2015  Huang .............. H04W 72/1226
                                                    370/329

FOREIGN PATENT DOCUMENTS

CN    101588590 A    11/2009
CN    101820685 A     9/2010
(Continued)

OTHER PUBLICATIONS

Aug. 19, 2015 Search Report issued in International Patent Application No. PCT/CN2015/078777.

*Primary Examiner* — Chirag G Shah
*Assistant Examiner* — Srinivasa R Reddivalam
(74) *Attorney, Agent, or Firm* — Oliff PLC

(57) ABSTRACT

Provided are an uplink frequency selection scheduling method and device. The method includes: receiving, by a base station, a sounding reference signal (SRS) sent by a user equipment (UE); determining an interference intensity of a PRB; determining a scheduling priority of the PRB according to the channel quality of the SRS and the interference intensity of the PRB; and conducting uplink frequency selection scheduling according to the scheduling priority. The embodiments of the present invention can improve the uplink performance of a TD-LTE system.

13 Claims, 3 Drawing Sheets

(56) References Cited

FOREIGN PATENT DOCUMENTS

| | | |
|---|---|---|
| CN | 103702431 A | 4/2014 |
| CN | 104023407 A | 9/2014 |
| WO | 2013048143 A2 | 4/2013 |

* cited by examiner

UPLINK FREQUENCY SELECTION SCHEDULING METHOD AND DEVICE

TECHNICAL FIELD

The embodiment of this invention involves communication technical field, especially an uplink frequency selection scheduling method and device.

BACKGROUND TECHNOLOGY

The uplink of F-band Time-Division Long-Term Evolution (TD-LTE) base stations may be subject to the downlink barrage jamming, intermodulation interference, and spurious emission interference of a nearby heterogenous system base station (e.g. Global System for Mobile communication (GSM) 900, Distributed Control System (DCS) 1800, Personal Handy-phone System (PHS)base station). Therefore, signals received via TD-LTE system uplink may experience strong disturbance, which will greatly impact uplink performance of TD-LTE base stations.

In existing technologies, engineering methods (e.g. antenna insulation, antenna replacement, roof adjustment, or addition of anti jamming filter) are used to address disturbance caused by heterogenous systems in certain station sites. However, in many station sites, due to workload, difficulty, and impact on existing GSM network, the operators are not in favor of such engineering disturbance suppression methods. Besides, some heterogenous system disturbances originate from base stations of other operators. As different operators adopt mutually independent network configurations, it is impossible to address disturbances from base stations of other operators through engineering methods.

Current technologies can improve uplink performance of a TD-LTE system by means of frequency selection scheduling. Frequency selection scheduling in a LTE system can effectively solve degraded wireless transmission due to frequency selective decay in wireless channel environment. Frequency selection scheduling is based on the following principle: In each scheduling cycle, each user equipment (UE) is assigned the physical resource block (PRB) with the best sub-band channel quality, thus improving cell throughput and user awareness. Specifically, the base station (eNodeB) performs SRS channel estimation based on the detection reference sounding reference signals (SRS) sent by UE, and measures channel quality of each sub-band with such channel estimation. Next, it will start uplink frequency selection scheduling based on the channel quality of each sub-band.

However, SRS can be sent periodically or non-periodically by UE. The minimum transmission cycle defined in the 3rd Generation Partnership Project (3GPP) protocol is 5 ms, and this interval is even longer for non-periodic transmission. The narrow-band interferences from a heterogenous system are random and intensive in nature with the form of pulses, which means the interfering signals last for a very short period of time and typically occur within certain fixed frequency ranges. Such interfering signals are not smooth and will not cover the whole SRS transmission cycle. Therefore, the signal to interference plus noise ratio (SINR) obtained through SRS channel estimation is not able to reflect impact of narrow-band interference. Consequently, uplink frequency selection scheduling based on SRS channel estimation will not suppress narrow-band interference from a heterogenous system. It can therefore be concluded that existing technologies fail to solve interferences caused by a heterogenous system.

INVENTION CONTENTS

The technical purpose of the embodiment of this invention is providing an uplink frequency selection scheduling method and device to improve uplink performance of TD-LTE systems in presence of interferences from a heterogenous system.

To address the above-mentioned issue, the embodiment of this invention has published a uplink frequency selection scheduling method consisting of the following steps: The base station receives SRS sent by UE; determines interference intensity of PRB; determines PRB scheduling priority based on SRS channel quality and PRB interference intensity; and performs uplink frequency selection scheduling based on priority.

Preferably determine the PRB scheduling priority based on SRS channel quality and PRB interference intensity. The following equation can be used in this regard:

$$SP=SINR/(1+PI/PN)$$

Where SP is the scheduling priority, SINR is SRS channel quality, PN is average noise power, and PI is PRB interference intensity.

Preferably determine PRB interference intensity. This includes calculation of PRB interference intensity based on average power and PRB average power in the whole bandwidth.

Preferably identify the disturbed PRBs through the following means before determination of PRB interference intensity:

If the difference between the average power of a certain sub-carrier in a time slot and sub-carrier average power in the full bandwidth is larger than or equal to the predefined interference testing threshold, and average power of the sub-carrier in the time slot is larger than or equal to the predefined uplink receiving power threshold, it can be determined that the sub-carrier has been disturbed in the time slot;

In a predefined testing period, if interference to a sub-carrier is detected for P times in the measurement cycles of N time slots, it can be determined that the sub-carrier has been disturbed, and P should be smaller than or equal to N;

The disturbed PRBs can be identified based on distribution of disturbed sub-carriers in the full bandwidth.

The PRB interference intensity is determined preferably. This includes the following steps: Calculate interference intensity at a disturbed PRB based on its average power and average PRB power in the full bandwidth; determine the undisturbed PRBs in the full bandwidth by excluding disturbed PRBs and determine their interference intensity as 0.

Preferably perform uplink frequency selection scheduling based on scheduling priority. In this process, assign M PRBs with the highest scheduling priority to UE as the uplink transmission resources, where M is a positive integer.

Preferably, SRS channel quality is determined based on SRS channel estimation results.

To address the above-mentioned issue, the embodiment of this invention has published a uplink frequency selection scheduling device consisting of the following: the receiving module, configured to receive SRS sent by UE; first determination module, configured to determine PRB interference intensity; second determination module, configured to determine PRB scheduling priority based on SRS channel quality and PRB interference intensity; and scheduling module, configured to perform uplink frequency selection scheduling based on scheduling priority.

Preferably, the second determination module is configured to determine PRB scheduling priority with the following equation:

$$SP=SINR/(1+PI/PN)$$

Where SP is scheduling priority, SINR is SRS channel quality, PN is average noise power, and PI is PRB interference intensity.

Preferably, the first determination module is configured to calculate PRB interference intensity based on PRB average power and average PRB power in the full bandwidth.

Preferably, the above device also contains an identification module, which is configured to identify the disturbed PRBs through the following means before determination of PRB interference intensity:

If the difference between the average power of a certain sub-carrier in a time slot and sub-carrier average power in the full bandwidth is larger than or equal to the predefined interference testing threshold, and average power of the sub-carrier in the time slot is larger than or equal to the predefined uplink receiving power threshold, it can be determined that the sub-carrier has been disturbed in the time slot;

In a predefined testing period, if interference to a sub-carrier is detected for P times in the measurement cycles of N time slots, it can be determined that the sub-carrier has been disturbed, and P should be smaller than or equal to N;

The disturbed PRBs are identified based on distribution of disturbed sub-carriers in the full bandwidth.

Preferably, the first determination module is configured to calculate PRB interference intensity at the disturbed PRBs based on their average power and average PRB power in the full bandwidth. The undisturbed PRBs in the full bandwidth are determined by excluding disturbed PRBs and their interference intensity is regarded as 0.

Preferably, the scheduling module is configured to assign M PRBs with the highest scheduling priority to UE as the uplink transmission resources, where M is a positive integer.

Preferably, SRS channel quality is determined based on SRS channel estimation results.

To address the above-mentioned issue, the embodiment of this invention has also published a computer program, including computer readable codes. When the said computer readable codes are run in a base station, the said base station will execute any of the said uplink frequency selection scheduling methods in the claim.

To address the above-mentioned issue, the embodiment of this invention has also published a computer readable medium where the claimed computer program is stored.

Compared with existing technologies, the embodiment of this invention provides the following advantages:

Existing technologies achieve uplink frequency selection scheduling based on SRS channel estimation. Because SINR obtained through SRS channel estimation fails to reflect impact of narrow-band interferences, such uplink frequency selection method is not able to suppress narrow-band interference from a heterogenous system. In the embodiment of this invention, the base station determines PRB scheduling priority based on SRS channel quality and PRB interference intensity, and uses such information to perform uplink frequency selection scheduling. As PRB interference intensity can reflect narrow-band interference conditions, the uplink frequency selection scheduling method provided by the embodiment of this invention can suppress narrow-band interference from a heterogenous system, thus improving TD-LTE system uplink performance.

SPECIFIC IMPLEMENTATION

To make the above purposes, features, and advantages of the embodiment of this invention more clear and understandable, the embodiment of this invention is further described in details with figures and embodiments.

First Embodiment

Figure 1:
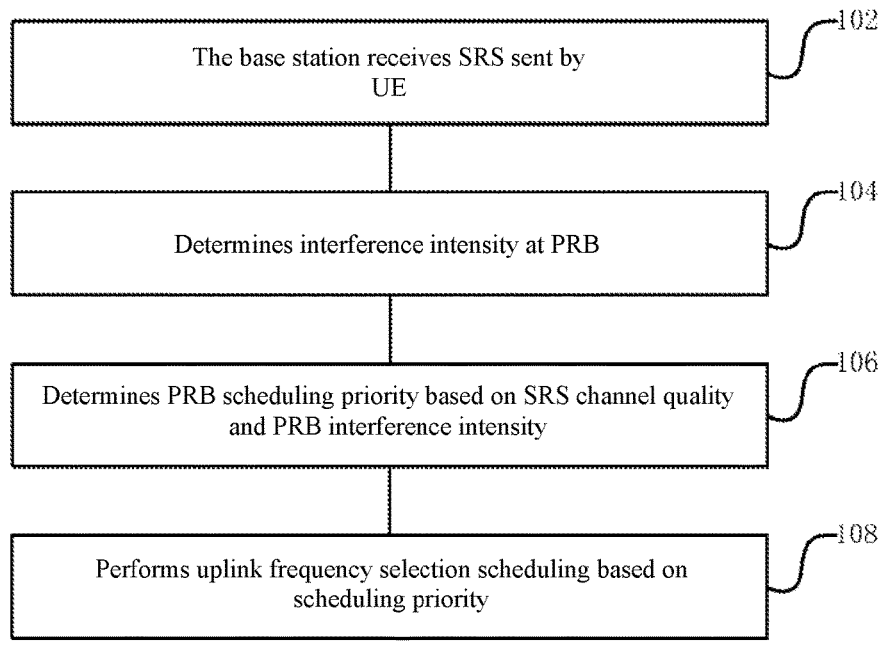
FIG. 1 gives the flow chart of an uplink frequency selection scheduling method based on the first embodiment of this invention.

FIG. 1 shows an uplink frequency selection scheduling method based on the first embodiment of this invention. It includes the following steps:

Step 102: The base station receives SRS sent by UE. This base station can be a TD-LTE base station.

Step 104: PRB interference intensity is determined.

During implementation, PRB interference intensity can be calculated based on PRB average power and average PRB power in the full bandwidth.

In a preferred embodiment of this invention, the disturbed PRBs can be identified first. Next, the average power of disturbed PRBs and average PRB power in the full bandwidth can be used to calculate interference intensity of disturbed PRBs. For undisturbed PRB, the interference intensity should be regarded as 0. This approach simplifies calculation of interference intensity of undisturbed PRBs, and consequently improves efficiency of determining PRB priority based on interference intensity.

In an preferred embodiment of this invention, interference detection can be made in the full bandwidth of the frequency domain to identify disturbed PRBs. The identification process can include the following steps: The base station performs interference testing for the whole bandwidth of the frequency domain. If the difference between the average power of a certain sub-carrier in a time slot and sub-carrier average power in the full bandwidth is larger than or equal to the predefined interference testing threshold, and average power of the sub-carrier in the time slot is larger than or equal to the predefined uplink receiving power threshold, it can be determined that the sub-carrier has been disturbed in the time slot; In a predefined testing period, if interference to a sub-carrier is detected for P times in the measurement cycles of N time slots, it can be determined that the sub-carrier has been disturbed, and P should be smaller than or equal to N; The disturbed PRBs can be identified based on distribution of disturbed sub-carriers in the full bandwidth.

Step 106: PRB scheduling priority is determined based on SRS channel quality and PRB interference intensity;

The SRS channel quality can be determined based on SRS channel estimation results through the following means: After base station receives SRS, it compares this SRS and locally stored SRS reference sequence to estimate SRS channel quality.

During implementation, the following equation can be used to determine the PRB scheduling priority:

$$SP=SINR/(1+PI/PN)$$

Where SP is scheduling priority, SINR is SRS channel quality, PN is average noise power, and Pi is PRB interference intensity. The above equation allows rapid determination of PRB scheduling priority.

In an preferred embodiment of this invention, the base station can make channel estimation based on received SRS to determine SRS channel quality. This SRS channel quality can be uplink SINR. PRB scheduling priority is determined based on PRB uplink SINR and interference intensity. PRB scheduling priority is determined as follows: At the same PRB uplink SINR, the higher the PRB interference intensity, the lower scheduling priority of the PRB; and the lower the PRB interference intensity, the higher scheduling priority of the PRB. Undisturbed PRBs have higher scheduling priority than disturbed PRBs. At the same PRB interference intensity, the higher the PRB uplink SINR, the higher scheduling priority of the PRB; and the lower the PRB uplink SINR, the lower the scheduling priority of the PRB. The scheduling priority determined in this way can reflect degree of narrow-band interference. Uplink frequency selection scheduling on this basis can improve uplink performance in scenarios with heterogenous system interference.

Step 108: Uplink frequency selection scheduling is performed based on scheduling priority.

For example, a base station assigns M PRBs with the highest scheduling priority to UE in the full bandwidth as uplink transmission resources, Where M is an positive integer. During the implementation, other methods can be used to perform uplink frequency selection scheduling as well. For example, a threshold can be defined in advance, and M PRBs with a priority higher than this threshold can be selected as the uplink transmission resources for UE.

Existing technologies achieve uplink frequency selection scheduling based on SRS channel estimation. Because SINR obtained through SRS channel estimation fails to reflect impact of narrow-band interferences, such uplink frequency selection method is not able to suppress narrow-band interference from a heterogenous system. In the embodiment, the base station determines PRB scheduling priority based on SRS channel estimation and PRB interference intensity, and uses such information to perform uplink frequency selection scheduling. As PRB interference intensity can reflect narrow-band interference conditions, the uplink frequency selection scheduling method provided by the embodiment can suppress narrow-band interference from a heterogenous system, thus improving TD-LTE system uplink performance.

Second Embodiment

Figure 2:
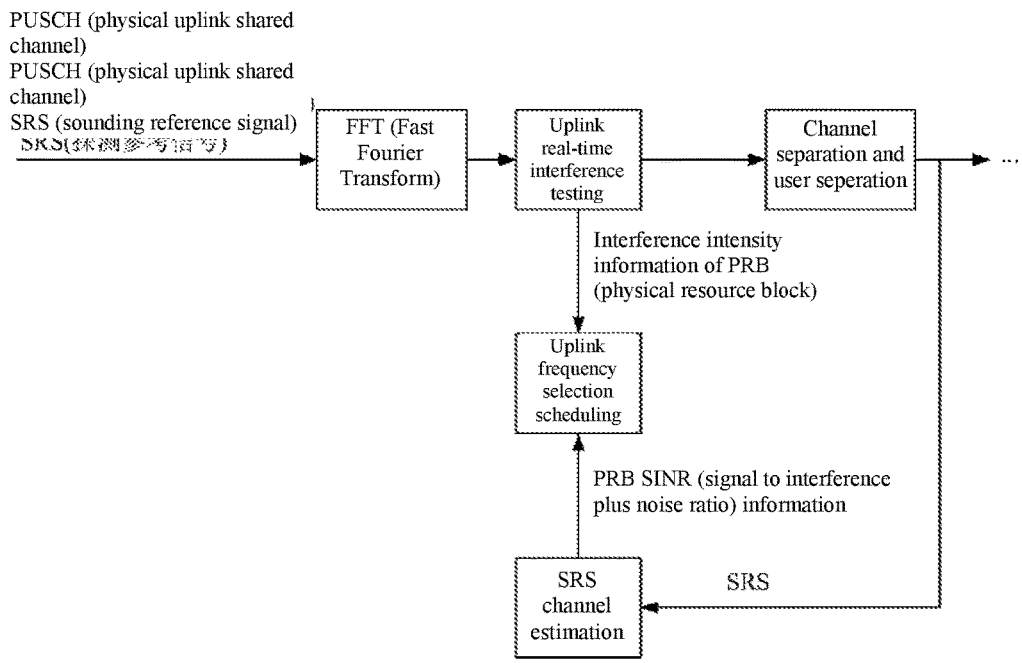
FIG. 2 is the diagram of an uplink frequency selection scheduling method based on the second embodiment of this invention.

The embodiment of this invention also provides an uplink frequency selection scheduling method that can be applied to TD-LTE base stations in F band, e.g. F-band TD-LTE evolving node B (eNodeB). In this method, the uplink base band processing module in the base station performs real-time interference testing based on narrow-band interference characteristics in the full bandwidth of the frequency domain. In this way, it identifies narrow-band interference and disturbed PRBs and calculates disturbed PRB interference intensity information. Next, the uplink scheduling module in the base station performs uplink frequency selection scheduling based on SRS channel quality information and interference intensity at the disturbed PRBs. FIG. 2 gives the diagram of an uplink frequency selection scheduling method based on second embodiment of this invention. The flow chart of this embodiment is described in details below with FIG. 2.

The base station receives the physical uplink shared channel (PUSCH), physical uplink control channel (PUCCH), and SRS uploaded by UE, and then performs Fast Fourier Transform (FFT) on them. Next the uplink base band processing module estimates SRS channel quality based on SRS sent by UE to calculate uplink SINR information for each PRB, which will then be transmitted to the uplink scheduling module.

The uplink base band processing module performs real-time interference detection in the full bandwidth of the domain frequency based on narrow-band interference features to identify narrow-band interference and disturbed PRB and to calculate interference intensity at the disturbed PRBs. The narrow-band interference testing method in this embodiment is described in details below.

The detection is made on the level of sub-carriers. Calculate average of the power values with all signs of a sub-carrier in a time slot. If the difference between the average power and sub-carrier average power in the full bandwidth is larger than or equal to the predefined interference testing threshold, and average power of the sub-carrier in the time slot is larger than or equal to the predefined uplink receiving power threshold, it can be determined that the sub-carrier has been disturbed in the time slot. In a predefined testing period, if interference to a sub-carrier is detected for P times in the measurement cycles of N time slots (P is smaller than or equal to N), it can be determined that the sub-carrier has been disturbed. The disturbed PRBs can be identified based on distribution of disturbed sub-carriers in the full bandwidth. In the implementation, it can be determined that a PRB has been disturbed if the number of disturbed sub-carriers in it exceeds the predefined threshold. PRB interference intensity is calculated based on average power of disturbed PRB and average PRB power in the full bandwidth.

Sub-carrier average power in the full bandwidth is defined as the average value of the power of each sub-carrier average in the full bandwidth. Disturbed PRB average power is defined as average value of the power of each sub-carrier average power in the disturbed PRB. The average PRB power in the full bandwidth is equal to average power of sub-carriers in the full bandwidth.

Once the uplink base band processing module detects narrow-band interference, it will transmit disturbed PRB information and its interference intensity information to the uplink scheduling module.

The uplink scheduling module determine scheduling priority of each PRB based on PRB uplink SINR information and disturbed PRB interference intensity information, and assigns PRB resources for UE based on PRB scheduling priority, thus achieving uplink frequency selection scheduling based on SRS information and interference information. In this embodiment, PRB scheduling priority can reflect the degree of impact of interference on PRB. At the same SRS channel quality, the higher the PRB interference intensity, the lower the scheduling priority; and the lower the PRB interference intensity, the higher the scheduling priority.

During implementation, PRB scheduling priority can be calculated with the following method:

$$SP=SINR/(1+PI/PN)$$

Where SP is PRB scheduling priority, SINR is SRS channel quality, PN is average noise power, and Pi is PRB interference intensity (i.e. interference power).

The SRS-based frequency selection scheduling method in existing technologies can hardly reflect impact of narrow-band interferences, A PRB subject to strong interference may have a high scheduling priority, thus causing a significant impact on uplink performance. In contrast, the uplink frequency selection scheduling method in this embodiment considers PRB interference intensity information. For each UE, the higher the interference intensity caused by a heterogenous system on a PRB to be assigned, the lower its scheduling priority, and vice versa. Hence, PRB resources assigned to each UE in each scheduling cycle are the best PRB resources in the channel. This helps effectively suppress strong interference from the heterogenous system, especially intermodulation interference and barrage jamming that may cause abnormal operation conditions of radio remote unit (RRU). Therefore, compared with existing SRS-based frequency selection scheduling method, this embodiment can effectively suppress strong interferences from a heterogenous system and improve cell uplink throughput and user experiences.

Third Embodiment

Figure 3:
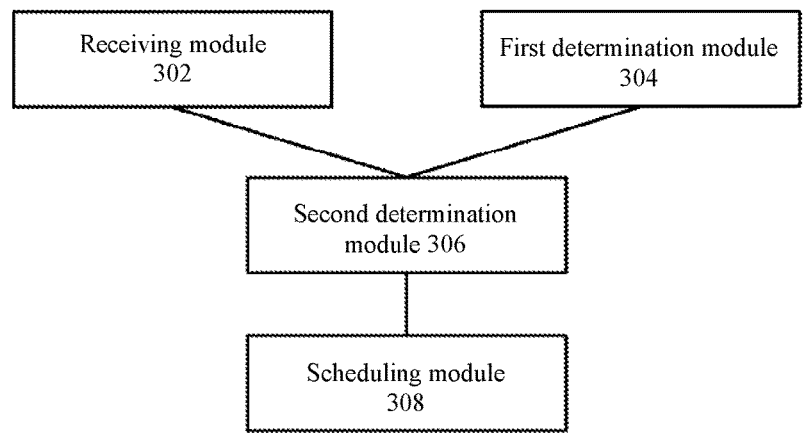
FIG. 3 is the block diagram of an uplink frequency selection scheduling device based on the third embodiment of this invention.

The embodiment of this invention also provides a uplink frequency selection scheduling device that can be used to realize the above method. Therefore, the features of the above method embodiment can be applied to this embodiment. This device can be either a base station or a part of the base station. FIG. 3 is the block diagram of an uplink frequency selection scheduling device based on the third embodiment of this invention. It can be seen from FIG. 3 that this device consists of the following:

The receiving module 302, configured to receive SRS sent by UE;

First determination module 304, configured to determine PRB interference intensity;

Second determination module 306, configured to determine PRB scheduling priority based on SRS channel quality and disturbed PRB interference intensity;

And scheduling module 308, configured to perform uplink frequency selection scheduling based on scheduling priority.

In a preferred embodiment of this invention, the second determination module 306 is configured to determine PRB scheduling priority through the following equation:

$$SP=SINR/(1+PI/PN)$$

Where SP is scheduling priority, SINR is SRS channel quality, PN is average noise power, and Pi is PRB interference intensity.

In an preferred embodiment of this invention, the first determination module 304 is configured to calculate PRB interference intensity based on PRB average power and average PRB power in the full bandwidth.

Figure 4:
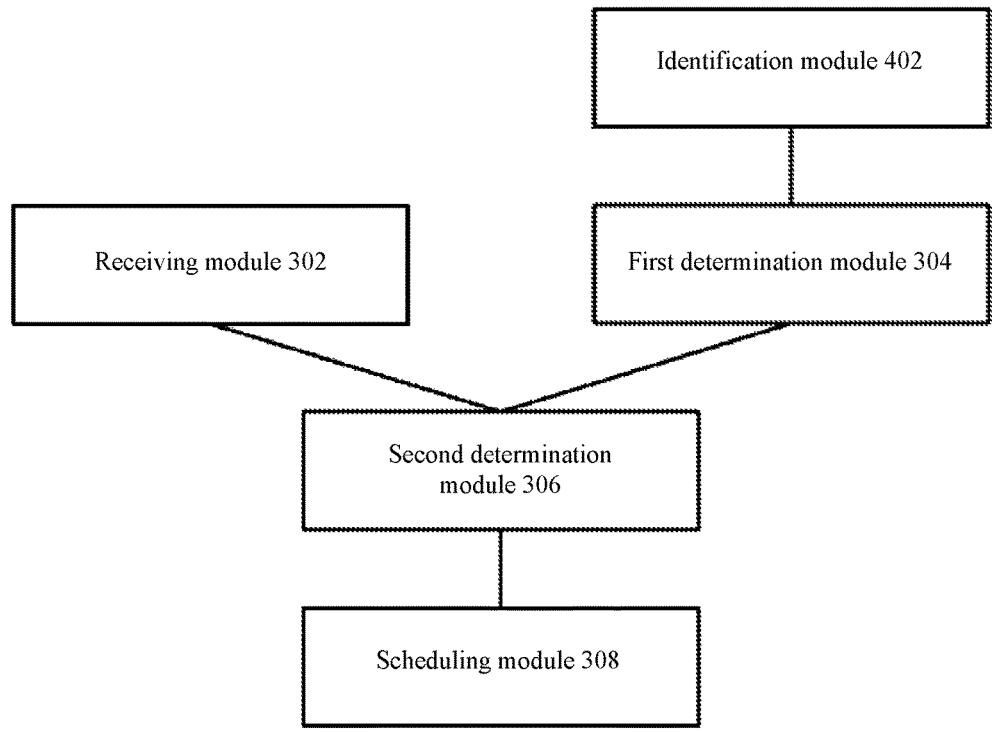
FIG. 4 is the preferred block diagram of an uplink frequency selection scheduling device based on the third embodiment of this invention.

In an preferred embodiment of this invention, FIG. 4 is the preferred block diagram of an uplink frequency selection scheduling device based on the third embodiment of this invention. It can be seen from FIG. 4 that the above device also includes identification module 402, which is configured to identify disturbed PRBs through the following means before determination of PRB interference intensity:

If the difference between the average power of a certain sub-carrier in a time slot and sub-carrier average power in the full bandwidth is larger than or equal to the predefined interference testing threshold, and average power of the sub-carrier in the time slot is larger than or equal to the predefined uplink receiving power threshold, it can be determined that the sub-carrier has been disturbed in the time slot;

In a predefined testing period, if interference to a sub-carrier is detected for P times in the measurement cycles of N time slots, it can be determined that the sub-carrier has been disturbed, and P should be smaller than or equal to N;

The disturbed PRBs can be identified based on distribution of disturbed sub-carriers in the full bandwidth.

In an preferred embodiment of this invention, the first determination module 304 is configured to calculate disturbed PRB interference intensity based on disturbed PRB average power and average PRB power in the full bandwidth. The undisturbed PRBs in the full bandwidth are determined by excluding disturbed PRBs and their interference intensity is regarded as 0.

In an preferred embodiment of this invention, scheduling module 308 is configured to assign M PRBs with the highest scheduling priority to UE as the uplink transmission resources, where M is a positive integer.

In an preferred embodiment of this invention, SRS channel quality is determined based on SRS channel estimation results.

Existing technologies achieve uplink frequency selection scheduling based on SRS channel estimation. Because SINR obtained through SRS channel estimation fails to reflect impact of narrow-band interferences, such uplink frequency selection method is not able to suppress narrow-band interference from a heterogenous system. In the embodiment, the base station determines PRB scheduling priority based on SRS channel estimation and PRB interference intensity, and uses such information to perform uplink frequency selection scheduling. As PRB interference intensity can reflect narrow-band interference conditions, the uplink frequency selection scheduling method provided by the embodiment can suppress narrow-band interference from a heterogenous system, thus improving TD-LTE system uplink performance.

All embodiments in this specification are described progressively. Description of each embodiment focuses on differences with other embodiments, while common and similar elements can be shared between them. Description of system embodiments is simple as they are quite similar to method embodiments. Relevant details can be found in the corresponding description about method embodiments.

The algorithms and demonstrations given here are not intrinsically associated with any particular computer, virtual system, or other device. All general-purpose system can be used in conjunction with demonstrations here. Based on the above descriptions, architectures for constructing such a system are apparent. In addition, this invention is not dependent on any particular programming language. It is understandable that various programming languages can be used to realize contents of this invention described herein, and that the above descriptions concerning specific languages are intended to reveal the best implementation of this invention.

This specification provides a lot of details. However, it is understandable that embodiments of this invention can be applied in practice without such details. Some embodiments do not describe commonly known methods, structures, and technologies in details to avoid vague understanding of this specification.

Similarly, it is understandable that to simplify this publication and to help understand one or more aspects of this invention, in the above descriptions about demonstrative embodiments of this invention, different features of this invention have been sometimes grouped into a single embodiment, figure, or description. However, the published method should not be interpreted as a reflection of the following intent: the claimed invention requires more features than those explicitly recorded in each claim, or more exactly as reflected in the following claim, the features of the invention should not be fewer than all features of any single embodiment published early. Therefore, claims in line with a specific embodiment are hereby incorporated into that embodiment explicitly, where each claim itself is regarded as a separate embodiment of this invention.

It is understandable to technical personnel in this field that the modules in an embodiment device can be changed adaptively and set in one or more devices other than the embodiment one. The modules, units, or components in an embodiment can be combined into one module, unit, or component, and they can also be divided into multiple sub-modules, sub-units, or sub-components. Except for such features and/or processes or cases where at least some of the units are mutually exclusive, any combination of all features published by this specification (including accompanying claims, abstracts, and figures) and any method or all processes or units of the device published in such a way is possible. Unless otherwise stated explicitly, each feature published in this specification (including accompanying claims, abstracts, and figures) can be replaced by a substitute feature that provides the same, equivalent, or similar purpose.

Also, it is understandable to technical personnel in this field that although some embodiments described herein contain some features rather than others from other embodiments, different embodiment feature combinations means creation of different embodiments in the range this invention. For example, in the following claim, any of the claimed embodiments can be combined in any means for use.

The different part embodiments of this invention can be realized with hardware, or with software modules operated in one or more processors, or with a combination of both. It is understandable to technical personnel in this field that micro-processors or digital signal processors (DSP) can be used in practice to realize some or all functions of some or all parts in a uplink frequency selection scheduling device based on the embodiment of this invention. This invention can also realize some or all devices or device programs (e.g. computer programs and computer program products) used to execute the methods described herein. The programs realized in such a way based on this invention can be stored in a computer readable medium, or take one or more signal forms. Such signals can be downloaded from Internet websites, or provided as carrier signals or in any other forms.

Figure 5:
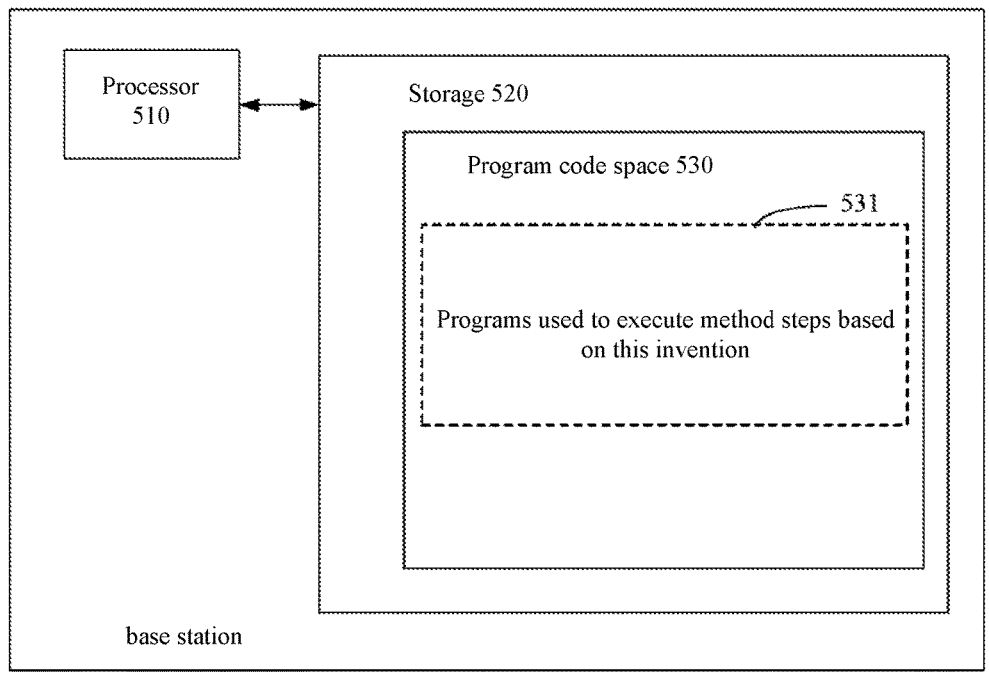
FIG. 5 is the block diagram of a base station used for performing uplink frequency selection scheduling method based on the embodiment of this invention; and, FIG. 6 is a storage unit used to maintain or carry program codes for implementing uplink frequency selection scheduling method based on the embodiment of this invention.
Figure 6:
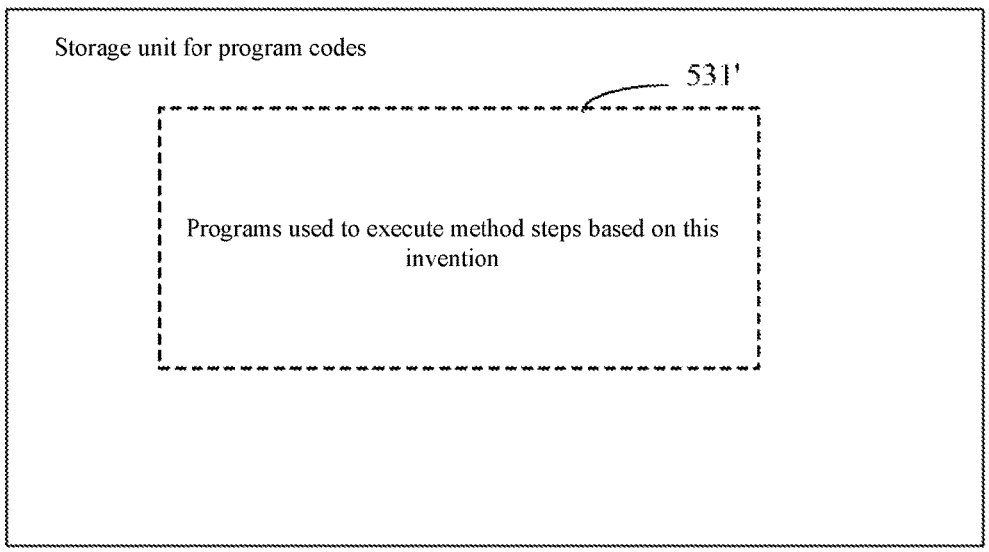

FIG. 5 is the block diagram of a base station used for performing uplink frequency selection scheduling method based on the embodiment of this invention. This base station traditionally includes processor 510 and computer program products or computer readable medium in the form of storage 520. Storage 520 can be a flash, EEPROM (electrically erasable programmable read-only memory), EPROM, hard drive, ROM, or other electronic storage device. Storage 520 provides a storage space 530 for executing program codes 531 of any steps in the above method. For example, the storage space 530 used for program codes can include individual program codes 531 for realizing different steps in the above method. Such program codes can be read out from one or more computer program products or written into the current product or multiple computer program products. Such computer program products include program code carriers such as hard drive, compact disk (CD), storage card, or floppy disk. Such computer program products are typically portable or immobile storage units as depicted in FIG. 6. Such storage units can have storage segments and space that are similar to those in the storage 520 of the base station in FIG. 5. The program codes can, e.g. be compressed in an appropriate form. Typically, the storage units contain computer readable codes 531', which are codes readable to processors such as 510. When such codes are executed by the base station, the base station will execute different steps in the above-mentioned method.

"One embodiment", "embodiment", or "one or more embodiments" in this document means that specific features, structures, or characteristics combined with embodiment description are included in at least one embodiment of this invention. Also please note that "in one embodiment" does not necessarily refer to the same embodiment.

An uplink frequency selection scheduling method and device provided by the embodiment of this invention is described in details in the above sections. In this document, specific cases are used to illustrate principle and implementation of the embodiment of this invention. The above embodiment descriptions are only intended to help understand method and core concept of embodiments of this invention. In the meanwhile, for general technical personnel in this field, based on concepts of embodiments of this invention, both the specific implementation method and application range can be altered. In sum, this specification should not be interpreted as any restriction to embodiments of this invention.

The invention claimed is:

1. An uplink frequency selection scheduling method comprising:
   receiving, by a base station, sounding reference signals (SRS) from a user equipment (UE);
   determining, by the base station, a physical resource block (PRB) interference intensity;
   determining, by the base station, PRB scheduling priority (SP) based on SRS channel quality (SINR), the determined said PRB interference intensity (Pi) and average noise power, wherein $SP=SINR/(1+Pi/PN)$ where PN is average noise power; and
   performing uplink frequency selection scheduling, by the base station, based on the determined PRB scheduling priority.

2. The method described in claim 1, wherein the determination of the PRB interference intensity includes calculation of the PRB interference intensity based on the PRB average power and average PRB power in the full bandwidth.

3. The method described in claim 1, wherein before determination of the PRB interference intensity, disturbed PRB s are identified through the following means:
   if the difference between the average power of a certain sub-carrier in a time slot and a sub-carrier average power in the full bandwidth is larger than or equal to a predefined interference testing threshold, and average power of the sub-carrier in the time slot is larger than or equal to the predefined uplink receiving power threshold, determining that the sub-carrier has been disturbed in the time slot;

in a predefined testing period, if interference to the sub-carrier is detected for P times in the measurement cycles of N time slots, determining that the sub-carrier has been disturbed, and that P should be smaller than or equal to N; and identifying the disturbed PRBs based on distribution of disturbed sub-carriers in the full bandwidth.

4. The method described in claim 3, wherein the determination of the PRB interference intensity includes:

calculation of interference intensity at the disturbed PRB based on the disturbed PRB average power and average PRB power in the full bandwidth; and determining the undisturbed PRBs in the full bandwidth by excluding the disturbed PRBs and regarding the interference intensity of the undisturbed PRBs as 0.

5. The method described in claim 1, wherein the performance of the uplink frequency selection scheduling based on the scheduling priority includes assigning M PRBs with the highest scheduling priority to the UE as the uplink transmission resources, where M is a positive integer.

6. The method described in claim 1, wherein the SRS channel quality is determined based on estimation results of the SRS channel.

7. An uplink frequency selection scheduling device comprising:

a memory;

a processor programmed to: receive sounding reference signals (SRS) from a user equipment (UE);

determine a physical resource block (PRB) interference intensity;

determine PRB scheduling priority (SP) based on SRS channel quality (SINR), the determined PRB interference intensity (Pi) and average noise power, wherein SP=SINR/(1+Pi/PN) where PN is average noise power; and perform uplink frequency selection scheduling based on the determined PRB scheduling priority.

8. The device described in claim 7, wherein the processor is further programmed to: calculate the PRB interference intensity based on the PRB average power and average PRB power in the full bandwidth.

9. The device described in claim 7, wherein the processor is further programmed to:

identify disturbed PRBs through the following means before determination of the PRB interference intensity:

if the difference between the average power of a certain sub-carrier in a time slot and a sub-carrier average power in the full bandwidth is larger than or equal to the predefined interference testing threshold, and average power of the sub-carrier in the time slot is larger than or equal to the predefined uplink receiving power threshold, determine that the sub-carrier has been disturbed in the time slot;

in a predefined testing period, if interference to the sub-carrier is detected for P times in the measurement cycles of N time slots, determine that the sub-carrier has been disturbed, and that P should be smaller than or equal to N; and identify the disturbed PRBs based on distribution of disturbed sub-carriers in the full bandwidth.

10. The device described in claim 9, wherein the processor is further programmed to:

calculate the disturbed PRB interference intensity based on the disturbed PRB average power and average PRB power in the full bandwidth; and determine the undisturbed PRBs in the full bandwidth by excluding the disturbed PRBs and regard the interference intensity of the undisturbed PRBs as 0.

11. The device described in claim 7, wherein the processor is further programmed to: assign M PRB s with the highest scheduling priority to the UE as uplink transmission resources, where M is a positive integer.

12. The device described in claim 7, wherein the SRS channel quality is determined based on estimation results of the SRS channel.

13. A non-transitory computer readable medium comprising computer executable instructions that, when executed by a base station computer, cause the base station computer to execute the uplink frequency selection scheduling method described in claim 1.

* * * * *